(12) United States Patent
Kim et al.

(10) Patent No.: US 8,899,175 B2
(45) Date of Patent: Dec. 2, 2014

(54) APPARATUS AND METHOD FOR DISPENSING LIQUID CRYSTAL MATERIAL

(75) Inventors: Wan-Soo Kim, Gyeonggi-Do (KR); Mu-Yeol Park, Daegu (KR); Sung-Su Jung, Gyeonggi-Do (KR); Hyug-Jin Kweon, Gyoungsangbuk-Do (KR); Hae-Joon Son, Pusan (KR)

(73) Assignee: LG Display Co., Ltd., Seoul (KR)

( * ) Notice: Subject to any disclaimer, the term of this patent is extended or adjusted under 35 U.S.C. 154(b) by 1143 days.

(21) Appl. No.: 11/600,808

(22) Filed: Nov. 17, 2006

(65) Prior Publication Data

US 2007/0101935 A1    May 10, 2007

Related U.S. Application Data

(62) Division of application No. 10/392,871, filed on Mar. 21, 2003, now Pat. No. 7,258,894.

(30) Foreign Application Priority Data

Mar. 23, 2002  (KR) .................................. 15867/2002
Mar. 23, 2002  (KR) .................................. 15870/2002

(51) Int. Cl.
*B05C 11/10* (2006.01)
*G02F 1/1341* (2006.01)

(52) U.S. Cl.
CPC .... *G02F 1/1341* (2013.01); *G02F 2001/13415* (2013.01)
USPC ........... 118/669; 118/677; 118/684; 118/712; 118/713

(58) Field of Classification Search
CPC  B05C 11/10; B05C 11/0002; B05C 11/1026; B05C 11/1028; B05C 11/1031; B05C 11/1034
USPC ........... 118/663, 669, 677, 712, 713, 58, 305, 118/684
See application file for complete search history.

(56) References Cited

U.S. PATENT DOCUMENTS

| | | | |
|---|---|---|---|
| 3,978,580 | A | 9/1976 | Leupp et al. |
| 4,094,058 | A | 6/1978 | Yasutake et al. |
| 4,653,864 | A | 3/1987 | Baron |
| 4,691,995 | A | 9/1987 | Yamazaki |
| 4,775,225 | A | 10/1988 | Tsuboyama |

(Continued)

FOREIGN PATENT DOCUMENTS

| | | |
|---|---|---|
| EP | 1 003 066 A1 | 5/2000 |
| JP | 51-65656 | 6/1976 |

(Continued)

OTHER PUBLICATIONS

Laid Open Gazette No. H04-000961; "Japanese Utility model publication No. 4-961;" (English Translation for Title and Claims) (17 pages), Published 1992.

*Primary Examiner* — George Koch
(74) *Attorney, Agent, or Firm* — McKenna Long & Aldridge LLP

(57) ABSTRACT

A liquid crystal material dispensing apparatus includes a spacer height measuring unit for measuring a height of a spacer on a substrate, and a liquid crystal material dispensing system for determining an amount of the liquid crystal material to be dispensed on the substrate based upon the measured spacer height and for dispensing the liquid crystal material onto the substrate.

16 Claims, 11 Drawing Sheets

(56) References Cited

U.S. PATENT DOCUMENTS

| | | |
|---|---|---|
| 5,247,377 A | 9/1993 | Omeis |
| 5,263,888 A | 11/1993 | Ishihara |
| 5,379,139 A | 1/1995 | Sato |
| 5,406,989 A | 4/1995 | Abe |
| 5,499,128 A | 3/1996 | Hasegawa |
| 5,507,323 A | 4/1996 | Abe |
| 5,511,591 A | 4/1996 | Abe |
| 5,539,545 A | 7/1996 | Shimizu |
| 5,548,429 A | 8/1996 | Tsujita |
| 5,642,214 A | 6/1997 | Ishii |
| 5,680,189 A | 10/1997 | Shimizu |
| 5,742,370 A | 4/1998 | Kim |
| 5,757,451 A | 5/1998 | Miyazaki |
| 5,852,484 A | 12/1998 | Inoue |
| 5,854,664 A | 12/1998 | Inoue |
| 5,861,932 A | 1/1999 | Inata |
| 5,875,922 A | 3/1999 | Chastine |
| 5,932,012 A * | 8/1999 | Ishida et al. .................. 118/669 |
| 5,952,676 A | 9/1999 | Sato |
| 5,956,112 A | 9/1999 | Fujimori |
| 6,001,203 A | 12/1999 | Yamada |
| 6,011,609 A | 1/2000 | Kato |
| 6,016,178 A | 1/2000 | Kataoka |
| 6,016,181 A | 1/2000 | Shimada |
| 6,055,035 A | 4/2000 | Von Gutfeld |
| 6,060,125 A * | 5/2000 | Fujii ................................. 427/8 |
| 6,061,225 A * | 5/2000 | Nojima ........................ 361/160 |
| 6,163,357 A | 12/2000 | Nakamura |
| 6,219,126 B1 | 4/2001 | Von Gutfeld |
| 6,226,067 B1 | 5/2001 | Nishiguchi |
| 6,236,445 B1 | 5/2001 | Foschaar |
| 6,304,306 B1 | 10/2001 | Shiomi |
| 6,304,311 B1 | 10/2001 | Egami |
| 6,337,730 B1 | 1/2002 | Ozaki |
| 6,414,733 B1 | 7/2002 | Ishikawa |
| 2001/0020629 A1* | 9/2001 | Fujii ............................. 222/504 |
| 2001/0021000 A1 | 9/2001 | Egami |
| 2001/0026348 A1* | 10/2001 | Murata et al. ................. 349/187 |

FOREIGN PATENT DOCUMENTS

| | | |
|---|---|---|
| JP | 57-038414 | 3/1982 |
| JP | 57-088428 | 6/1982 |
| JP | 58-027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-007822 | 1/1986 |
| JP | 61-055625 | 3/1986 |
| JP | S62-054225 | 3/1987 |
| JP | S62-054228 | 3/1987 |
| JP | S62-054229 | 3/1987 |
| JP | 62-089025 | 4/1987 |
| JP | 62-090622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | 04-296861 | 11/1992 |
| JP | H05-036425 | 2/1993 |
| JP | H05-036426 | 2/1993 |
| JP | H05-107533 | 4/1993 |
| JP | 05-127179 | 5/1993 |
| JP | 05-154923 | 6/1993 |
| JP | 05-265011 | 10/1993 |
| JP | 05-281557 | 10/1993 |
| JP | 05-281562 | 10/1993 |
| JP | H06-018829 | 1/1994 |
| JP | 06-051256 | 2/1994 |
| JP | H06-064229 | 3/1994 |
| JP | 06-148657 | 5/1994 |
| JP | 06-160871 | 6/1994 |
| JP | H06-194637 | 7/1994 |
| JP | 06-235925 | 8/1994 |
| JP | 06-265915 | 9/1994 |
| JP | 06-313870 | 11/1994 |
| JP | 07-084268 | 3/1995 |
| JP | 07-128674 | 5/1995 |
| JP | 07-181507 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 08-101395 | 4/1996 |
| JP | 08-106101 | 4/1996 |
| JP | H08-110504 | 4/1996 |
| JP | H08-136937 | 5/1996 |
| JP | 08-171094 | 7/1996 |
| JP | 08-190099 | 7/1996 |
| JP | H08-173874 | 7/1996 |
| JP | 08-240807 | 9/1996 |
| JP | 09-005762 | 1/1997 |
| JP | 09-026578 | 1/1997 |
| JP | H09-001026 | 1/1997 |
| JP | 09-311340 | 2/1997 |
| JP | 09-61829 | 3/1997 |
| JP | 09-073075 | 3/1997 |
| JP | 09-073096 | 3/1997 |
| JP | H09-094500 | 4/1997 |
| JP | 09-127528 | 5/1997 |
| JP | 09-230357 | 9/1997 |
| JP | 09-281511 | 10/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-014953 | 1/1999 |
| JP | 11-038424 | 2/1999 |
| JP | 11-064811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-002879 | 1/2000 |
| JP | 2000-029035 | 1/2000 |
| JP | 2000-056311 | 2/2000 |
| JP | 2000-066165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 3/2001 |
| JP | 2001-066615 | 4/2001 |
| JP | 2001-091727 | 4/2001 |
| JP | 2001-117105 | 4/2001 |
| JP | 2001-117109 | 5/2001 |

(56) References Cited

FOREIGN PATENT DOCUMENTS

| | | |
|---|---|---|
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 6/2001 |
| JP | 2001-154211 | 6/2001 |
| JP | 2001-166272 | 6/2001 |
| JP | 2001-166310 | 6/2001 |
| JP | 2001-183683 | 7/2001 |
| JP | 2001-201750 | 7/2001 |
| JP | 2001-209052 | 8/2001 |
| JP | 2001-209056 | 8/2001 |
| JP | 2001-209057 | 8/2001 |
| JP | 2001-209058 | 8/2001 |
| JP | 2001-209060 | 8/2001 |
| JP | 2001-215459 | 8/2001 |
| JP | 2001-222017 | 8/2001 |
| JP | 2001-235758 | 8/2001 |
| JP | 2001-255542 | 9/2001 |
| JP | 2001-264782 | 9/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001-330840 | 11/2001 |
| JP | 2001-356353 | 12/2001 |
| JP | 2001-356354 | 12/2001 |
| JP | 2002-014360 | 1/2002 |
| JP | 2002-023176 | 1/2002 |
| JP | 2002-049045 | 2/2002 |
| JP | 2002-079160 | 3/2002 |
| JP | 2002-080321 | 3/2002 |
| JP | 2002-082340 | 3/2002 |
| JP | 2002-090759 | 3/2002 |
| JP | 2002-090760 | 3/2002 |
| JP | 2002-107740 | 4/2002 |
| JP | 2002-122870 | 4/2002 |
| JP | 2002-122872 | 4/2002 |
| JP | 2002-122873 | 4/2002 |
| JP | 2002-131762 | 5/2002 |
| JP | 2002-139734 | 5/2002 |
| JP | 2002-156518 | 5/2002 |
| JP | 2002-169166 | 6/2002 |
| JP | 2002-169167 | 6/2002 |
| JP | 2002-182222 | 6/2002 |
| JP | 2002-202512 | 7/2002 |
| JP | 2002-202514 | 7/2002 |
| JP | 2002-214626 | 7/2002 |
| JP | 2002-229042 | 8/2002 |
| JP | 2002-236276 | 8/2002 |
| JP | 2002-258299 | 8/2002 |
| JP | 2002-236292 | 9/2002 |
| JP | 2002-277865 | 9/2002 |
| JP | 2002-277866 | 9/2002 |
| JP | 2002-277881 | 9/2002 |
| JP | 2002-287156 | 10/2002 |
| JP | 2002-296605 | 10/2002 |
| JP | 2002-311438 | 10/2002 |
| JP | 2002-311440 | 10/2002 |
| JP | 2002-311442 | 10/2002 |
| JP | 2002-323687 | 11/2002 |
| JP | 2002-323694 | 11/2002 |
| JP | 2002-333628 | 11/2002 |
| JP | 2002-333635 | 11/2002 |
| JP | 2002-333843 | 11/2002 |
| JP | 2002-341329 | 11/2002 |
| JP | 2002-341355 | 11/2002 |
| JP | 2002-341356 | 11/2002 |
| JP | 2002-341357 | 11/2002 |
| JP | 2002-341358 | 11/2002 |
| JP | 2002-341359 | 11/2002 |
| JP | 2002-341362 | 11/2002 |
| KR | 2000-0035302 | 6/2000 |

* cited by examiner

APPARATUS AND METHOD FOR DISPENSING LIQUID CRYSTAL MATERIAL

This application is a Divisional of prior application Ser. No. 10/392,871, filed Mar. 21, 2003 now U.S. Pat. No. 7,258,894, which claims the benefit of Korean Patent Application Nos. 15867/2002 and 15870/2002 both filed in Korea on Mar. 23, 2002, each of which are hereby incorporated by reference in their entirety as if fully set forth herein.

BACKGROUND OF THE INVENTION

1. Field of the Invention

The present invention relates to a liquid crystal dispensing apparatus, and more particularly, to the liquid crystal dispensing apparatus for controlling amounts of liquid crystal material dispensed onto a substrate.

2. Description of the Related Art

Recently, various portable electric devices, such as mobile phones, personal digital assistants (PDA), and notebook computers have been developed, because of their small size, light weight, and power-efficient operations. Accordingly, flat panel display devices, such as liquid crystal displays (LCDs), plasma display panels (PDPs), field emission displays (FEDs), and vacuum fluorescent displays (VFDs), have been developed. Of these flat panel display devices, the LCDs are currently mass produced because of their simple driving scheme and superior image quality.

FIG. 1 is a cross sectional view of a liquid crystal display LCD device according to the related art. In FIG. 1, a LCD device 1 comprises a lower substrate 5, an upper substrate 3, and a liquid crystal layer 7 formed therebetween. The lower substrate 5 is a driving device array substrate, and includes a plurality of pixels (not shown) and a driving device, such as a thin film transistor (TFT), formed on each pixel. The upper substrate 3 is a color filter substrate, and includes a color filter layer for reproducing real color. In addition, a pixel electrode and a common electrode are formed on the lower substrate 5 and the upper substrate 3, respectively. An alignment layer is formed on both the lower and upper substrtes 5 and 3 to align liquid crystal molecules of the liquid crystal layer 7.

The lower substrate 5 and the upper substrate 3 are attached along a perimeter by a sealing material 9, and the liquid crystal layer 7 is confined within the perimeter. In addition, the liquid crystal molecules of the liquid crystal layer 7 are reoriented by the driving device formed on the lower substrate 5 to control amounts of light transmitted through the liquid crystal layer 7, thereby displaying an image.

FIG. 2 is a flow chart of a fabrication method for an LCD device according to the related art. In FIG. 2, a fabrication method includes three sub-processes for manufacturing an LCD device: a driving device array substrate process for forming the driving device on the lower substrate 5; a color filter substrate process for forming the color filter on the upper substrate 3; and a cell process.

In Step S101, a plurality of gate lines and data lines are formed on the lower substrate 5 to define a pixel area by the driving device array process, and the thin film transistor connected to both the gate line and the data line is formed on the each pixel area. In additon, a pixel electrode, which is connected to the thin film transistor to drive the liquid crystal layer according to a signal applied through the thin film transistor, is formed by the driving device array process.

In Step S104, R (Red), G (Green), and B (Blue) color filter layers for reproducing the color and a common electrode are formed on the upper substrate 3 by the color filter process.

In Steps S102 and S105, alignment layers are formed on the lower substrate 5 and the upper substrate 3. Then, the alignment layers are individually rubbed to induce surface anchoring (i.e., a pretilt angle and alignment direction) for the liquid crystal molecules of the liquid crystal layer 7.

In Step S103, a spacer is dispersed onto the lower substrate 5 for maintaining a uniform cell gap between the lower and upper substrates 5 and 3.

In Step S106, a sealing material is applied along outer portions of the upper substrate 3.

In Step S107, the lower and upper substrates 5 and 3 are to bonded together by compression.

The lower substrate 5 and the upper substrate 3 are both made from a glass substrate, and include a plurality of unit panel areas on which the driving device and the color filter layer are formed.

In Step S108, the bonded upper and lower glass substrates 5 and 3 are cut into unit panels.

In Step S109, liquid crystal material is injected into the gap formed between the upper and lower substrates 5 and 3 of the unit panels through a liquid crystal injection hole.

In Step S109, the filled unit panel is completed by sealing the liquid crystal injection hole.

In Step S110, the filled and sealed unit panel is inspected.

FIG. 3 is a schematic view of a liquid crystal injection system for fabricating an LCD device according to the related art. In FIG. 3, a container 12 in which liquid crystal material 14 is contained is placed in a vacuum chamber 10, and the liquid crystal display panel 1 is located at an upper side of the container 12. Then, the vacuum chamber 10 is connected to a vacuum pump (not shown) to maintain a predetermined vacuum/pressure state within the vacuum chamber 10. In addition, a liquid crystal display panel moving device (not shown) is installed in the vacuum chamber 10 to move the liquid crystal display panel 1 from the upper side of the container 12 to a surface of the liquid crystal material 14, thereby contacting an injection hole 16 of the liquid crystal display panel 1 to the liquid crystal material 14. Accordingly, this method is commonly called a liquid crystal dipping injection method.

When the vacuum/pressure level within the chamber 10 is decreased by an inflow of nitrogen gas (N2) into the vacuum chamber 10 in the state that the injection hole 16 of the liquid crystal display panel 1 contacts the surface of the liquid crystal material 14, the liquid crystal material 14 is injected into the liquid crystal display panel 1 through the injection hole 16 by the pressure differential between the vacuum/pressure level within the liquid crystal display panel 1 and the pressure/level within the vacuum chamber 10. After the liquid crystal material 14 is completely filled into the liquid crystal display panel 1, the injection hole 16 is sealed by a sealing material to seal the liquid crystal material 14 within the liquid crystal display panel 1. Accordingly, this method is called as vacuum injection method.

However, there are several problems with both the liquid crystal dipping injection method and/or vacuum injection method. First, an overall time for injection of the liquid crystal material 14 into the panel 1 is relatively long. In general, a gap thickness between the driving device array substrate and the color filter substrate in the liquid crystal display panel 1 is relatively narrow, i.e., a few micrometers. Accordingly, a relatively small amount of liquid crystal material 14 is injected into the liquid crystal display panel 1 per unit time. For example, it takes about 8 hours to completely inject the liquid crystal material 14 into a 15-inch liquid crystal display panel, and thus, fabricating efficiency is decreased.

Second, consumption of the liquid crystal material 14 increases during the liquid crystal injection method. A small amount of the liquid crystal material 14 in the container 12 is actually injected into the liquid crystal display panel 1. Accordingly, during loading of the liquid crystal display panel 1 into the vacuum chamber 10, the unused liquid crystal material 14 is exposed to atmosphere or to certain gases, thereby contaminating the liquid crystal material 14. Thus, any remaining liquid crystal material 14 must be discarded after the injection of the liquid crystal material 14 into a plurality of liquid crystal display panels 1, thereby increasing fabrication costs.

SUMMARY OF THE INVENTION

Accordingly, the present invention is directed to an apparatus and method for dispensing liquid crystal material that substantially obviates one or more of the problems due to limitations and disadvantages of the related art.

An object of the present invention is to provide an apparatus and method of dispensing liquid crystal material directly onto a glass substrate.

Another object of the present invention is to provide a liquid crystal material dispensing apparatus for determining an amount of liquid crystal material to be dispensed onto a substrate based on a height of a spacer.

Another object of the present invention is to provide a method for dispensing liquid crystal material onto a substrate.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal material dispensing apparatus includes a spacer height measuring unit for measuring a height of a spacer on a substrate, and a liquid crystal material dispensing system for determining an amount of the liquid crystal material to be dispensed on the substrate based upon the measured spacer height and for dispensing the liquid crystal material onto the substrate.

In another aspect, a liquid crystal material dispensing apparatus includes a liquid crystal material dispensing system for dispensing the liquid crystal material onto a substrate with a predetermined pattern, and a control unit for calculating a compensated amount of the liquid crystal material by calculating a dispensing amount of the liquid crystal material based on an input spacer height and comparing the calculated dispensing amount of the liquid crystal material with a predetermined dispensing amount of the liquid crystal material, and for controlling an amount of the liquid crystal material dispensed onto the substrate.

In another aspect, a method for dispensing liquid crystal material includes measuring a height of a spacer on a substrate, calculating a dispensing amount of the liquid crystal material based on the measured spacer height, and dispensing the calculated amount of the liquid crystal material onto the substrate.

In another aspect, a method of dispensing liquid crystal material includes inputting a height of a spacer on a substrate, calculating a dispensing amount of the liquid crystal material based on the inputted spacer height and calculating a compensated amount of the liquid crystal material by comparing the calculated dispensing amount of the liquid crystal material with a predetermined dispensing amount of the liquid crystal material, and dispensing the liquid crystal material onto the substrate, the liquid crystal material having an amount obtained by applying the calculated amount of the liquid crystal material compensated to the dispensing amount of the liquid crystal material.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
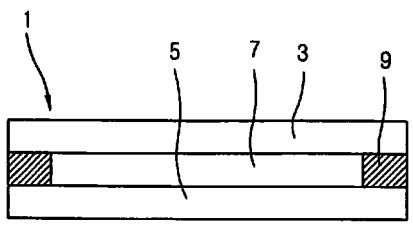
FIG. 1 is a cross sectional view of a liquid crystal display LCD device according to the related art.
Figure 2:
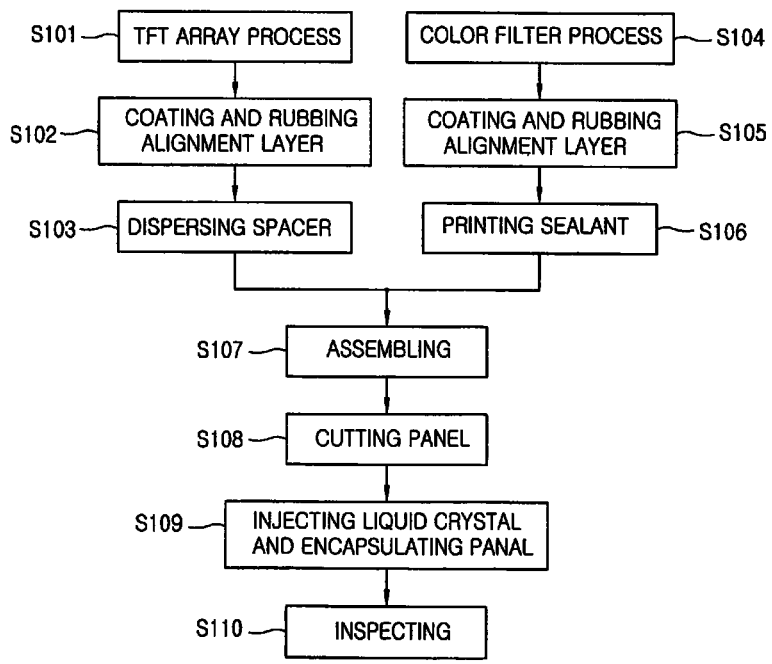
FIG. 2 is a flow chart of a fabrication method for an LCD device according to the related art.
Figure 3:
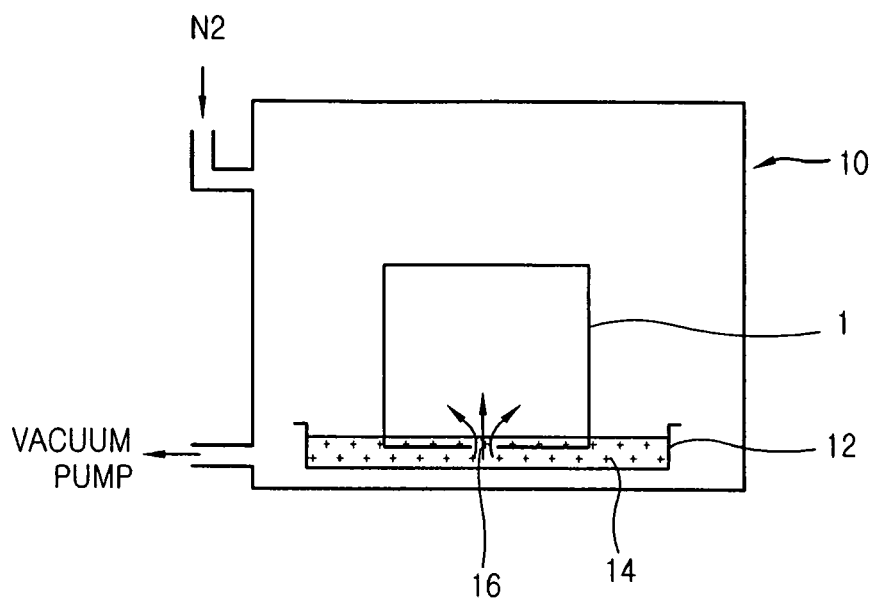
FIG. 3 is a schematic view of a liquid crystal injection system for fabricating an LCD device according to the related art.
Figure 4:
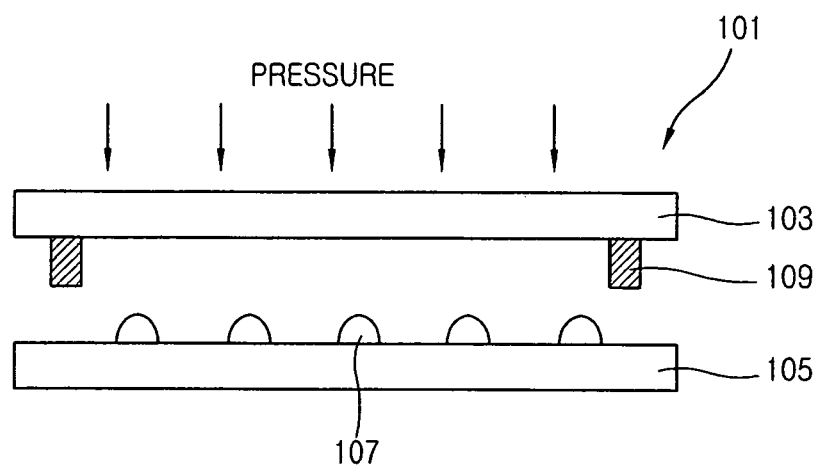
FIG. 4 is a cross sectional view of an exemplary LCD device fabrication method according to the present invention.

FIG. 4 is a cross sectional view of an exemplary LCD device fabrication method according to the present invention. In FIG. 4, liquid crystal material 107 may be dropped onto a lower substrate 105 having a driving device prior to assembling the lower substrate 105 and an upper substrate 103 having a color filter. Alternatively, the liquid crystal material 107 may be dropped onto the upper substrate 103 upon which the color filter is formed. For example, the liquid crystal material 107 may be formed either on a thin film transistor (TFT) substrate or on a color filter (CF) substrate.

A sealing material 109 may be applied along at least an outer perimeter portion of the upper substrate 103. Then, the upper substrate 103 and the lower substrate 105 may be bonded together by compressing the upper and lower substrates 103 and 105 together to form an LCD display panel 101. Accordingly, the drops of the liquid crystal material 107 may spread out between the upper and lower substrates 103 and 105 by pressure applied to the upper and/or lower substrates 103 and 105, thereby forming a liquid crystal material layer of uniform thickness between the upper substrate 103 and the lower substrate 105. Thus, in the exemplary LCD device fabrication method according to the present invention, the liquid crystal material 107 may be dropped onto the lower substrate 105 before the upper and lower substrates 103 and 105 are bonded together to form the LCD display panel 101.

Figure 5:
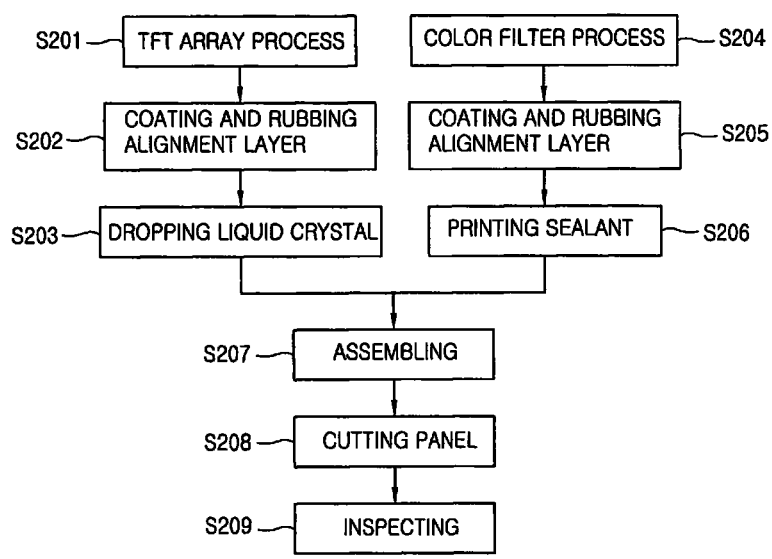
FIG. 5 is a flow chart of an exemplary LCD device fabrication method according to the present invention.

FIG. 5 is a flow chart of an exemplary LCD device fabrication method according to the present invention. In Step S201, a driving device, such as a TFT, may be formed on an upper substrate using a TFT array process.

In Step S204, a color filter layer may be formed on a lower substrate 105 using a color filter process. The TFT array process and the color filter process generally similar to those of common processes may be preferably applied to glass substrates having a plurality of unit panel areas. Here, the upper and lower substrates may include a glass substrate having an area about 1000×1200 mm2 or more. However, glass substrates having smaller areas also may be used.

In Steps S202 and S205, alignment layers may be formed and rubbed on both the upper and lower substrates.

In Step S203, liquid crystal material may be dropped onto a liquid crystal display unit panel area of the lower substrate 105.

In Step S206, sealing material may be applied along at least an outer perimeter portion area of the liquid crystal display unit panel area on the upper substrate.

In Step S207, the upper and lower substrates may be disposed to face each other, and may be compressed to bond the upper and lower substrates to each other using the sealing material. Accordingly, the dropped liquid crystal material may evenly spread out between the upper and lower substrates and the sealing material.

In Step S208, the bonded upper and lower substrates may be processed and cut into a plurality of liquid crystal display unit panels.

In Step S209, the liquid crystal display unit panels may be inspected.

Figure 6:
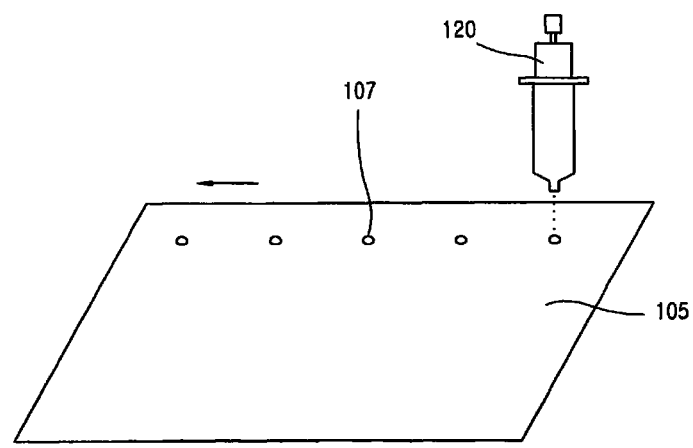
FIG. 6 is a perspective view of another exemplary LCD device fabrication method according to the present invention.

FIG. 6 is a perspective view of another exemplary LCD device fabrication method according to the present invention. In FIG. 6, liquid crystal material 107 may be dispensed onto a glass substrate 105 using a liquid crystal dispensing apparatus 120 positioned above the glass substrate 105. Although not shown, the liquid crystal material 107 may be contained in the liquid crystal dispensing apparatus 120.

As the liquid crystal material 107 is dropped onto the glass substrate 105, the glass substrate 105 may move along x- and y-directions according to a predetermined speed, while the liquid crystal dispensing apparatus 120 discharges the liquid crystal material 107 at predetermined time intervals. Accordingly, the liquid crystal material 107 dropping onto the glass substrate 105 may be arranged along x- and y-directions with predetermined intervals therebetween. Alternatively, the glass substrate 105 may be fixed, while the liquid crystal dispensing apparatus 120 moves along the x- and y-directions to drop the liquid crystal material 107 with the predetermined intervals. However, a shape of the liquid crystal material 107 may be altered by any vibration of the liquid crystal dispensing apparatus 120, whereby errors in the dropping position and the dropping amount of the liquid crystal material 107 may occur. Therefore, it may be preferable that the liquid crystal dispensing apparatus 120 be fixed and that the glass substrate 105 be moved.

Figure 7A:
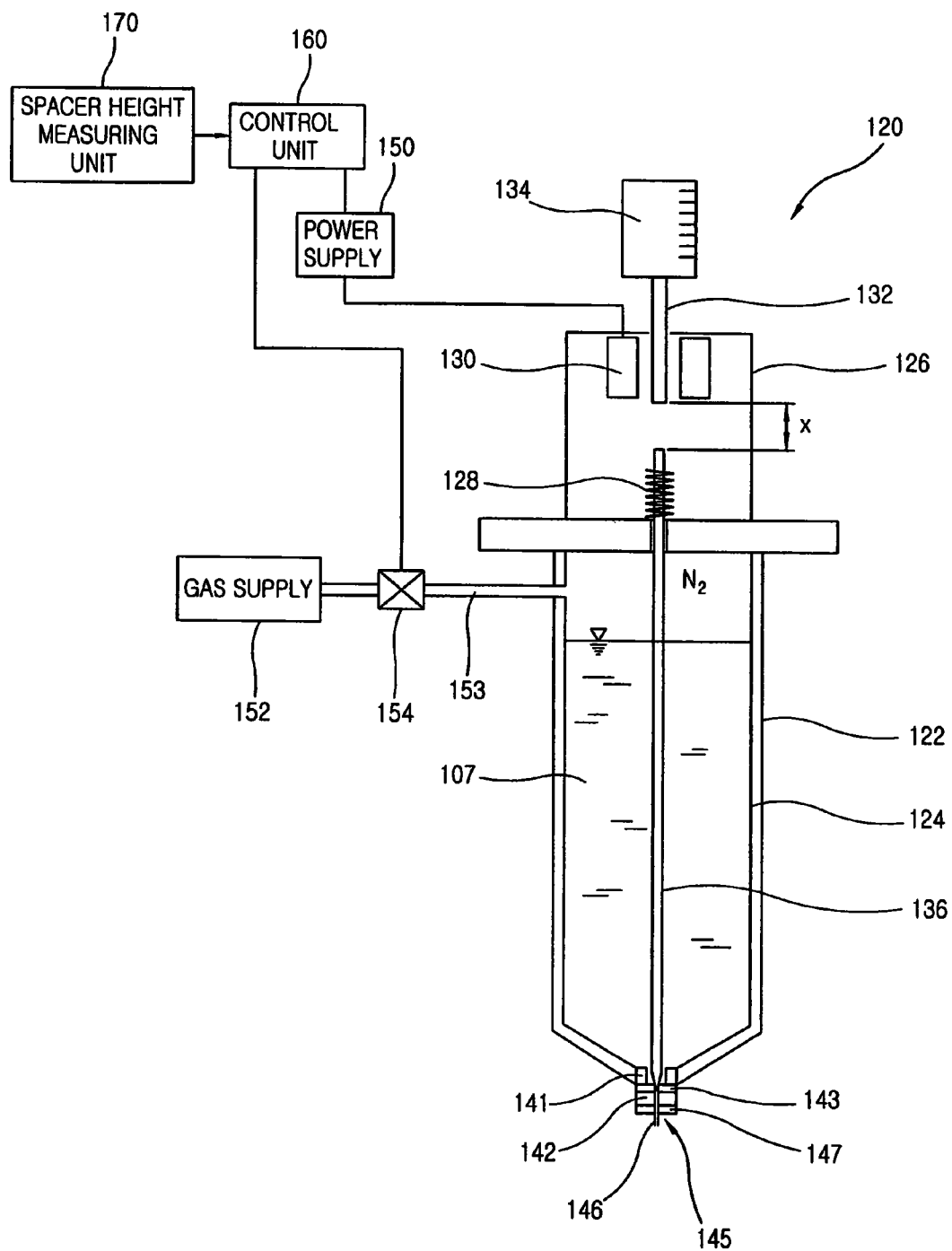
FIGS. 7A and 7B are schematic views of an exemplary liquid crystal dispensing apparatus according to the present invention.
Figure 7B:
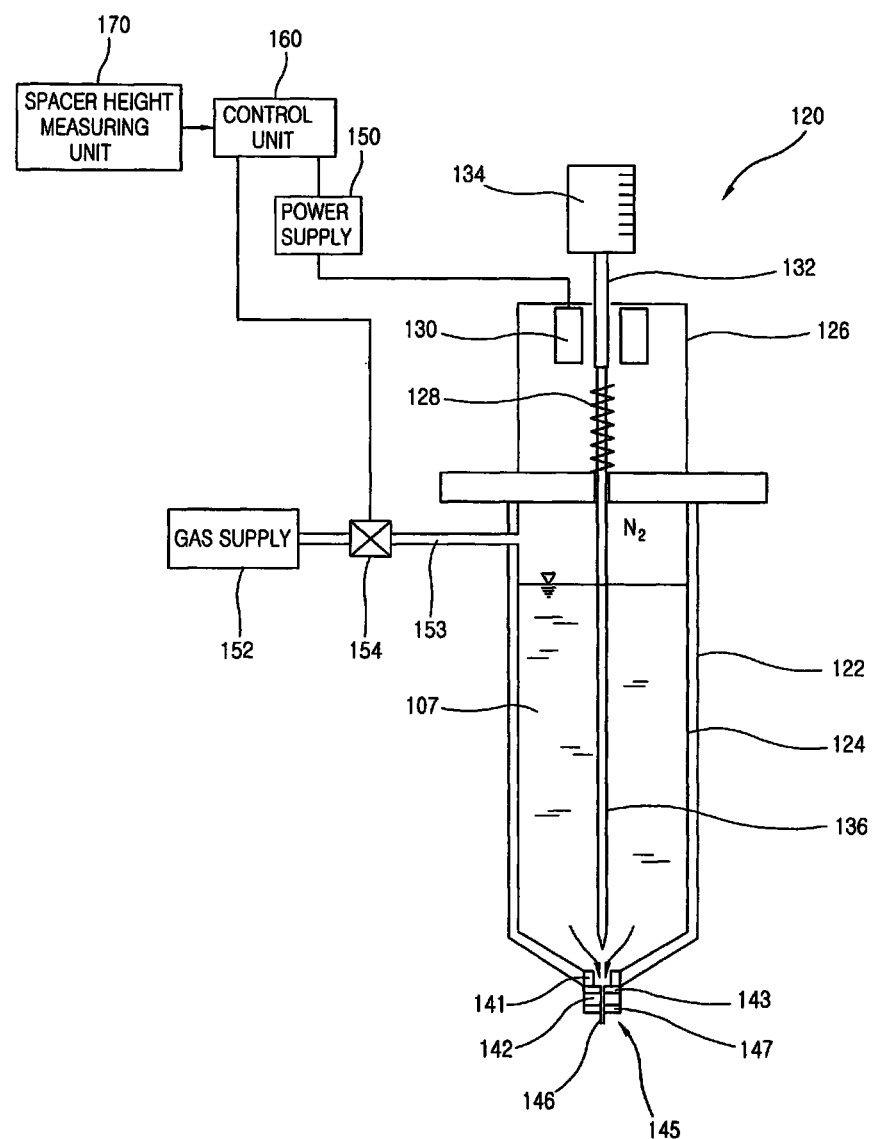

FIGS. 7A and 7B are schematic views of an exemplary liquid crystal dispensing apparatus according to the present invention. In FIG. 7A, liquid crystal material 107 of a liquid crystal dispensing apparatus 120 is not being dispensed, and in FIG. 7B illustrates the liquid crystal dispensing apparatus 120 when the liquid crystal material 107 is being dispensed.

In FIGS. 7A and 7B, the liquid crystal dispensing apparatus 120 may include a cylindrically shaped liquid crystal material container 124. The liquid crystal material container 124 may include a material having a high mobility, high plasticity, and be substantially non-reactive with the liquid crystal material 107. However, materials, such as polyethylene, have a low strength and may therefore become easily deformed by application of stress. When the liquid crystal material container 124 is deformed, the liquid crystal material 107 may not be precisely dispensed onto a substrate (not shown). Accordingly, the liquid crystal material container 124 may be inserted within a case 122 formed of a material having a high strength (e.g., stainless steel). A gas supply tube 153 may be connected to an exterior gas supply unit 152, and may be arranged at an upper portion of the liquid crystal material container 124. Inert gas, such as nitrogen (N2), may be provided by the exterior gas supply unit 152, transported through the gas supply tube 153, and arranged within portions of the liquid crystal material container 124 not occupied by liquid crystal material 107. Accordingly, the gas may press on the liquid crystal material 107 and induce the liquid crystal material to be dispensed onto the substrate (not shown).

The liquid crystal material container 124 may include a material that does not deform, such as stainless steel. Accordingly, when the liquid crystal material container 124 is formed out of stainless steel, the case 122 may not be required, thereby reducing fabrication costs of the liquid crystal dispensing unit 120. The interior of the liquid crystal material container 124 may be coated with a fluorine resin, thereby preventing the liquid crystal material 107 contained within the liquid crystal material container 124 from chemically reacting with sidewalls of the liquid crystal material container 124.

Although not shown, a protrusion may extend from a lower portion of the liquid crystal material container 124, and an opening may be formed within the case 122 to receive the protrusion. Accordingly, the protrusion of the liquid crystal material container 124 may be inserted into the opening of the case 122 and may be coupled to a first coupling portion 141. A first female threaded portion (i.e., nut) may be arranged on the protrusion while a first male threaded portion (i.e., bolt) may be formed on a first side of the first coupling portion 141. Accordingly, the protrusion and the first coupling portion 141 may be coupled together via the first female and male threaded portions.

A second female threaded portion may be formed on a second side of the first coupling portion 141, and a second male threaded portion may be formed on a first side of a second coupling portion 142. Accordingly, first and second coupling portions 141 and 142 may be coupled to each other via the second female and male threaded portions.

A needle sheet 143 may be inserted into the second female threaded portion of the first coupling portion 141. Accordingly, the needle sheet 143 may be arranged between the first and second coupling portions 141 and 142 when the second male threaded portion of the second coupling portion 142 is inserted into and coupled with the second female threaded portion of the first coupling portion 141. Thus, the liquid crystal material 107 may exit the liquid crystal dispensing apparatus 120 via a discharging hole (not shown) formed within the needle sheet 143.

A nozzle 145 may be arranged on the second coupling portion 142 and coupled to the first coupling portion 141 via the second female threaded portion and the second male threaded portion. The nozzle 145 may include a supporting portion 147 coupled to the second female threaded portion and a discharging opening 146, through which the liquid crystal material 107 disposed within the liquid crystal material container 124 may be dispensed onto the substrate.

The discharging opening 146 may protrude from the supporting portion 147, which may include the second male threaded portion. The discharging opening 146 that is formed within the nozzle 145 may have a relatively small diameter to allow precise control in dispensing of the liquid crystal material 107.

A discharging tube (not shown) may be formed within the supporting portion 147 and may extend into the discharging hole (not shown) of the needle sheet 143. The discharging tube may be connected to the discharging opening 146.

A needle 136 may be inserted into the liquid crystal material container 124 such that a first end of the needle 136 contacts the needle sheet 143. The first end of the needle 136 may be provided with a conical shape having dimensions substantially conforming to the dimensions of the discharging hole. Accordingly, when the needle 136 contacts the needle sheet 143, the needle 136 may block the discharging hole and prevent the flow of the liquid crystal material 107.

A second end of the needle 136 may be arranged near an upper case 126 of the liquid crystal dispensing apparatus 120 where a spring 128 and a magnetic bar 132 are provided. The magnetic bar 132 may be formed of a ferromagnetic or soft magnetic material, for example. A gap controlling unit 134 may be disposed above the needle 136 and the magnatic bar 132, and a solenoid coil 130 having a cylindrical shape, for example, may be arranged to surround at least a portion of the magnetic bar 132. Although not shown, the solenoid coil 130 may be connected to and receive electric power from an electric power supply unit 150. Upon supply of the electric power, the solenoid coil 130 may exert a magnetic force onto the magnetic bar 132.

The needle 136 and the magnetic bar 132 may be spaced apart from each other by a predetermined distance X. Accordingly, when the electric power is supplied to the solenoid coil 130, a magnetic force is exerted onto the magnetic bar 132 to induce the needle 136 to move along an upward direction to contact the magnetic bar 132. When the electric power is not supplied to the solenoid coil 130, the elastic force of the spring 128 returns the needle 136 along a downward direction to its original position. Accordingly, the upward and downward direction movements of the needle 136 toward and away from the needle sheet 143 may open and close the discharging hole formed in the needle sheet 143. However, as the first end of the needle 136 and the needle sheet 143 repeatedly contact each, which is dependent upon the presence of electric power supplied to the solenoid coil 130, the first end of the needle 136 and the needle sheet 143 may both become damaged. Accordingly, the first end of the needle 136 and the needle sheet 143 may be formed of a hard material, such as a metal, that is substantially resistant to deformation. In addition, the needle 136 may be formed of a magnetic material such that it may be magnetically attracted by the magnetic bar 132.

In FIG. 7B, when electric power is supplied to the solenoid coil 130, the needle 136 travels along the upward direction away from the needle sheet 143, thereby opening the discharging opening. Accordingly, nitrogen gas supplied to the liquid crystal material container 124 presses on the liquid crystal material 107, thereby causing the liquid crystal material 107 to be dispensed through the nozzle 145. The amount of the liquid crystal material 107 dispensed through the nozzle depends upon the time during which the discharging opening is open as well as the pressure of the nitrogen gas within the liquid crystal material container 124. The time during which the discharging opening is opened is dependent upon the distance X between the needle 136 and the magnetic bar 132, the magnetic force exerted on the magnetic bar 132 by the solenoid coil 130, and the intrinsic elastic force of the spring 128. The magnetic force exerted on the magnetic bar 132 is proportional to a total number of windings of the solenoid coil 130 or to a magnitude of the electric power supplied to the solenoid coil 130. The distance X between the needle 136 and the magnetic bar 132 may be controlled by the gap controlling unit 134.

A flow control valve 154 may be arranged at the gas supply tube 153 supplying gas from the gas supply 152 to the liquid crystal material container 124. The flow control valve 154 regulates the flow of gas into the liquid crystal material container 124 according to a control signal supplied from a main control unit 160. Accordingly, a predetermined pressure may be maintained within the liquid crystal material container 124 using, for example, the main control unit 160 and the flow control valve 154. In addition to controlling the flow control valve 154, the main control unit 160 may also control the amount of electric power the electric power supply 150 supplies to the solenoid coil 130.

In addition, a spacer height measuring unit 170 may be connected to the control unit 160 to measure a height of a spacer disposed on the substrate, and may provide the measured height to the control unit 160. In the method of dispensing the liquid crystal material, a patterned spacer or a column spacer may be used. For example, in case of dispensing the liquid crystal material onto a large area liquid crystal display panel having the ball spacers, uniform dispersion of the ball spacers is difficult. Accordingly, the patterned spacers are formed at a predetermined position on the liquid crystal display panel. The patterned spacer may be formed on the color filter substrate during the color filter process Step S204 (in FIG. 5), and the liquid crystal material may be dropped on the thin film transistor. Then, the color filter substrate and the TFT substrate may be assembled to complete the liquid crystal display panel. In the liquid crystal material dispensing method, an amount of the liquid crystal material dispensed on the TFT substrate is dependent on an area of the substrate, the total number of panels to be formed on the substrate, viscosity of the liquid crystal material, and the predetermined height of the cell gap.

In the case where the height of the patterned spacer formed on the color filter substrate is different from the predetermined height of the cell gap, a discrepancy may exist where an amount of the liquid crystal material within the liquid crystal display panel is different from an optimum amount of the liquid crystal material even though the predetermined amount of dispensed liquid crystal material is dispensed on the substrate. If the amount of the liquid crystal material dispensed is less than the optimum dispensing amount, problems may be generated in the liquid crystal display device during a normally-black mode and during a normally-white mode.

In addition, if the amount of the dispensed liquid crystal material is greater than the optimum dispensing amount, a gravitation inferiority may generated when the liquid crystal display panel is fabricated. The gravitation inferiority is generated as a volume of the liquid crystal material formed in the liquid crystal display panel is increased by an increase in temperature when the liquid crystal display panel is fabricated. Accordingly, the cell gap of the liquid crystal display panel increases to an amount greater than the height of the spacer, and the liquid crystal material migrates downward due to gravity. Thus, the cell gap of the liquid crystal display panel becomes uneven and degrades display qualities of the liquid crystal display device. The spacer height measuring unit 170 measures the height of the patterned spacer formed on the substrate at the time of dispensing the liquid crystal material, and determines an amount of the liquid crystal material dispensed by the measured height, thereby consistently determining an optimum amount of the liquid crystal material to be dispensed on the substrate.

Herein, if the substrate on which the patterned spacer is formed is different from the substrate on which the liquid crystal material is dispensed, the height of the spacer may measure during steps involved in the color filter process Steps S204-S206 (in FIG. 5). Then, the measured height of the spacer may be transmitted to the TFT array process Steps S201-S203 (in FIG. 5) where the liquid crystal material is dispensed, thereby determining an amount of the liquid crystal material dispensed and dispensing the liquid crystal material. Accordingly, the spacer measuring unit may be incorporated into the color filter process Steps S204-S206, and an additional unit for transmitting the measured height of the spacer may be necessary, thereby increasing cost of equipment. Moreover, where the measured height of the of the color filter substrate is not matched to that of the TFT substrate which will be assembled, dispensing inferiority may be generated.

Figure 8:
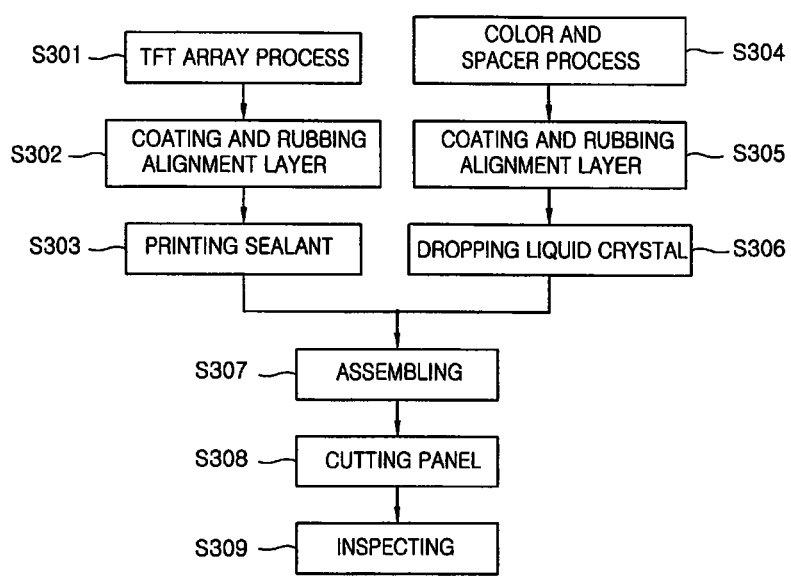
FIG. 8 is a flow chart of another exemplary LCD device fabrication method according to the present invention.

FIG. 8 is a flow chart of another exemplary LCD device fabrication method according to the present invention. In FIG. 8, Step S301 may include forming thin film transistors on a lower substrate using a TFT array process.

In Step S304, a color filter may be formed on an upper substrate by a color filter process. In addition, patterned spacers may be formed on predetermined regions of the upper substrate during the color filter process.

In Steps S302 and S305, alignment layers may be applied on both the lower and upper substrates, respectively, and then individually rubbed.

In Step S303, a sealing material may be applied along an outer portion of the lower substrate.

In Step S306, liquid crystal material may be dispensed on the upper substrate.

In Step S307, the upper substrate upon which the sealing material is applied and the lower substrate upon which the liquid crystal material is dispensed may be assembled.

In Step S308, the assembled upper and lower substrates may be processed.

In Step S309, the processed upper and lower substrates may be inspected.

During the above-detailed fabrication process of the liquid crystal display panel, measuring of the pattern spacer height and dispensing of the liquid crystal material may be performed at the upper substrate corresponding to the color filter substrate. Accordingly, measuring of the patterned spacer height and dispensing of the liquid crystal material may be performed by the same device. The spacer height measuring unit 170 (in FIG. 7) formed integrally with the liquid crystal dispensing apparatus may provide for measuring the height of the patterned spacers, by which the process shown in FIG. 8 may be performed.

Figure 9:
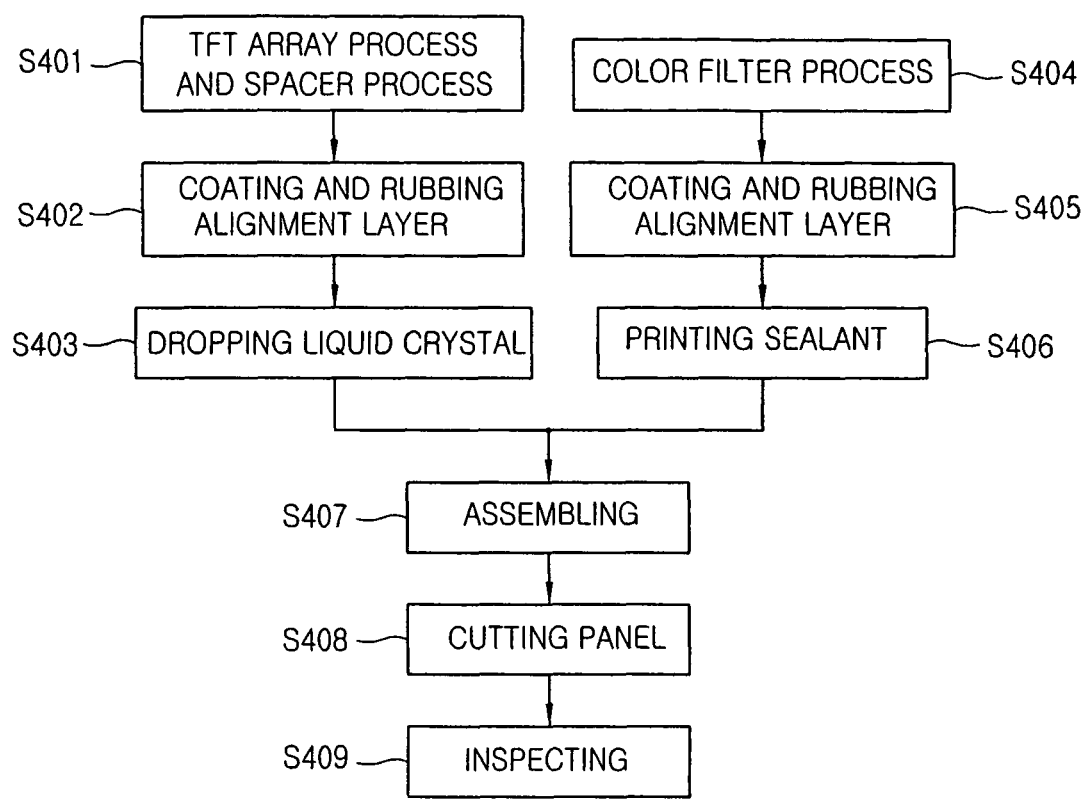
FIG. 9 is a flow chart of another exemplary LCD device fabrication method according to the present invention.

FIG. 9 is a flow chart of another exemplary LCD device fabrication method according to the present invention. In FIG. 9, Step S401 may include forming thin film transistors on a lower substrate during a TFT array process. In addition, patterned spacers may be formed in predetermined regions of the lower substrate during a spacer process.

In Step S404, a color filter may be formed on an upper substrate by a color filter process.

In Steps S402 and S405, alignment layers may be applied to both the lower and substrates, respectively, and then individually rubbed.

In Step S403, liquid crystal material may be dispensed on the lower substrate.

In Step S406, sealing material may be printed along outer portions of the upper substrate.

In Step S407, the upper substrate upon which the sealing material is applied and the lower substrate upon which the liquid crystal material is dispensed may be assembled.

In Step S408, the assembled upper and lower substrates may be processed.

In Step S409, the processed upper and lower substrates may be inspected.

A height of the patterned spacers may be obtained by various methods, such as use of a laser or a mechanical method, using the spacer height measuring unit 170 (in FIG. 7). The spacer height measuring unit 170 may be integrated with the liquid crystal dispensing apparatus, but may be formed separately. As shown in FIG. 5, for example, measuring of the height of the patterned spacers and dispensing of the liquid crystal material may be performed during different processes. Accordingly, the liquid crystal dispensing apparatus and the spacer height measuring unit 170 may be arranged along different processing lines for the TFT array process and the color filter process, respectively. However, the spacer height measuring unit 170 may input the measured data to the liquid crystal dispensing apparatus since they may be directly or indirectly connected to each other.

Figure 10:
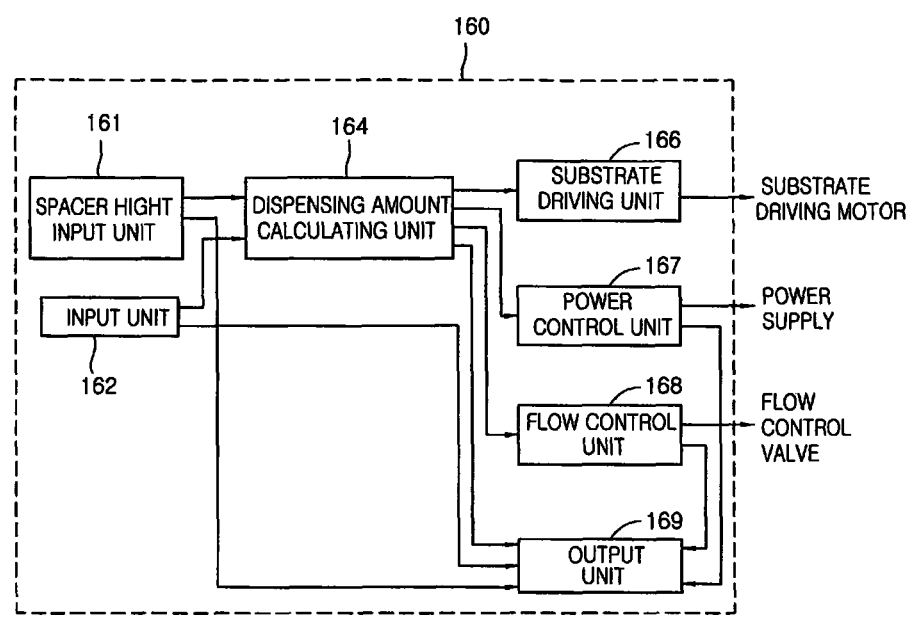
FIG. 10 is a block diagram of an exemplary control system shown in FIGS. 7A and 7B according to the present invention.

FIG. 10 is a block diagram of an exemplary control system shown in FIGS. 7A and 7B according to the present invention. In FIG. 10, the control unit 160 may include a spacer height input unit 161 to which the height of the patterned spacers may be measured by the spacer height measuring unit 170; an input unit 162 into which information regarding a specific region of the substrate, a total number of individual display panels which will be formed on the substrate, and the liquid crystal material information may be provided; a dispensing amount calculating unit 164 for calculating an amount of the liquid crystal material dispensed onto the substrate based on the input height of the patterned spacers and the input liquid crystal material information; a substrate driving unit 166 for driving the substrate to locate a dispensing position thereon just below the liquid crystal dispensing device; an electric power control unit 167 for driving the power supply 150 to supply electric power from the power supply 150 corresponding to the calculated dispensing amount of the liquid crystal material from the dispensing amount calculating unit 164 to the substrate; a flow control unit 168 for calculating an amount of gas corresponding to the calculated dispensing amount from the dispensing amount calculating unit 164 and controlling the flow control valve 154 in order to control a flow amount of gas supplied from the gas supply 152 to a liquid crystal material container 124; and an output unit 169 for outputting each information, such as the determined patterned spacer height, the calculated dispensing amount of the liquid crystal material, and a current liquid crystal material dispensing situation. The dispensing amount calculating unit 164 calculates an amount of liquid crystal material dispensed on the liquid crystal display panel and a unitary amount of the liquid crystal material dispensed on a basis of the size of the display panel, the height of the patterned spacers, and liquid crystal material information.

Figure 11:
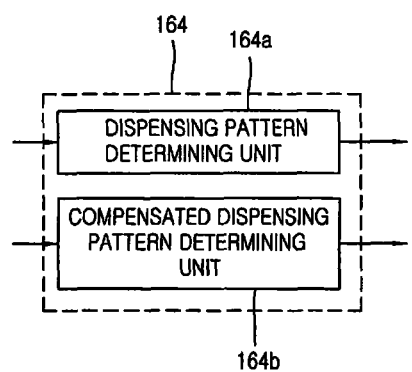
FIG. 11 is a block diagram of an exemplary dispensing amount calculating unit show in FIG. 10 according to the present invention.

FIG. 11 is a block diagram of an exemplary dispensing amount calculating unit shown in FIG. 10 according to the present invention. In FIG. 11, the dispensing amount calculating unit 164 may include a dispensing pattern determining unit 164a and a compensated dispensing pattern determining unit 164b. The amount of the liquid crystal material dispensed on the substrate may be calculated on a basis of an area of the display panel, the height of the patterned spacers, and characteristics of the liquid crystal material and the substrate. The liquid crystal material dispensed on the substrate flows between the upper and lower substrates by application of pressure when the upper and lower substrates are assembled together. The flow of the liquid crystal material may be influenced by characteristics of the liquid crystal material, such as viscosity, and the structure of the substrate, such as a patterned spacer arrangement. Accordingly, the flow within a region where a single amount of the liquid crystal material may be determined, and the dispensed pattern determining unit 164a may determine a pattern of the liquid crystal material dispensed on the display panel within the region.

The dispensing pattern determining unit 164a may determine a pattern of the liquid crystal display panel initially dispensed. For example, in the case that the liquid crystal material is dispensed on the display panel of the same size, if an initial liquid crystal material dispensing is started, the liquid crystal material may be consecutively dispensed on the liquid crystal display panel. Accordingly, the same information may be input and determination of a new dispensing pattern may not be necessary. However, the height of the patterned spacers, which can be changed by external force or processing conditions at the time of the spacer process, may generate an error from the predetermined height (a height of the spacer initially measured). Accordingly, due to generation of the spacer height error, the dispensing amount of the liquid crystal material may have to be compensated, which is possible by correcting the dispensing pattern. The dispensing pattern determining unit 164a determines the dispensing pattern according to the compensation amount of the amount of the liquid crystal material dispensed, thereby dispensing the liquid crystal material of the corresponding amount on the substrate even if the height of the patterned spacers is changed.

The determined dispensing pattern (that is, the dispensing times of the liquid crystal material, the unitary dispensing amount of the liquid crystal material, and the dispensing position) may be input to the substrate driving unit 166, the electric power control unit 167, and the flow control unit 168. The electric power control unit 167 determines electric power to be supplied based on the determined data (the dispensing times of the liquid crystal material and the unitary dispensing amount of the liquid crystal material), and outputs the signal to the power supply 150, thereby supplying the corresponding electric power to the solenoid coil 130. The flow control unit 168 determines the flow amount of gas to be supplied based on the input data and controls the flow control valve 154, thereby supplying nitrogen of the corresponding amount to the liquid crystal material container 124. In addition, the substrate driving unit 166 outputs the substrate driving signal based on the determined data of the liquid crystal material dispensing position, and drives the substrate driving motor (not shown) to move the substrate, thereby aligning the liquid crystal dispensing apparatus to the liquid crystal material dispensing position of the substrate.

The amount of the liquid crystal material may be calculated by the electric power control unit 167 and the flow control unit 168, and then the calculated amount of the liquid crystal material may be dispensed on the substrate. An amount of the liquid crystal material dispensed on the substrate may be influenced by an elasticity force of the spring 128 arranged at the needle 136, the supply amount of gas supplied to the liquid crystal material container 124 (that is, the pressure applied to the liquid crystal material), and an amount of electric power applied to the solenoid coil 130. Among these factors, the elasticity force of the spring 128 may be the least changeable factor in changing the amount of the liquid crystal material to be dispensed, thereby being defined in advance. Accordingly, the dispensing amount of the liquid crystal material may be mainly dependent upon the supply amount of gas supplied to the liquid crystal material container 124 and the amount of electric power applied to the solenoid coil 130. Thus, the dispensing amount of the liquid crystal material may be varied by controlling one factor of the two factors while maintaining the other factor at a constant level.

The output unit 169 may display not only the size of the liquid crystal display panel and the liquid crystal material characteristic information input through the input unit 162, but may also display the measured height of the patterned spacers input through the spacer height input unit 161. In addition, the output unit 169 may display the current dispensing state, such as the dispensing pattern based on the input data, the dispensing times of the liquid crystal material, the unitary dispensing amount of the liquid crystal material, the dispensing times that the liquid crystal material that has been dispensed presently, the current dispensing position, and the current dispensing amount of the liquid crystal material, so that the user can identify these values at all times during the fabrication processes.

Figure 12:
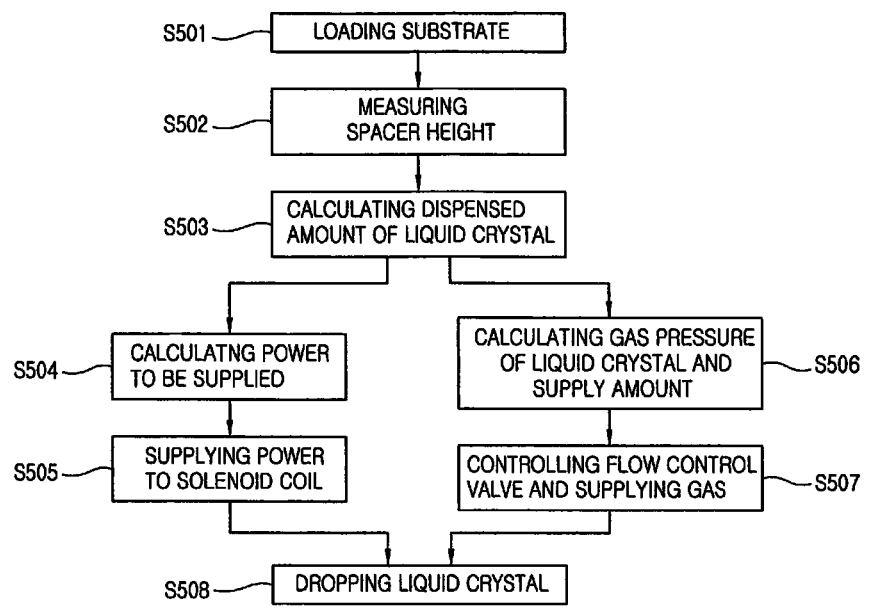
FIG. 12 is a flow chart of another exemplary LCD device fabrication method according to the present invention.

FIG. 12 is a flow chart of another exemplary LCD device fabrication method according to the present invention. In FIG. 12, Step S501 may include loading one of the TFT substrate and the color filter substrate.

In Step S502, a height of patterned spacers formed during a previous process may be measured by a patterned spacer height measuring unit.

In Step S503, the measured height of the patterned spacers may be input to a liquid crystal dispensing apparatus. Accordingly, the input information, a dispensing amount of liquid crystal material, dispensing times of the liquid crystal material, dispensing position, and unitary dispensing amount of the liquid crystal material may be determined.

In Step S504, an amount of electric power to be supplied to a solenoid coil 130 (in FIGS. 7A and 7B) may be determined by a calculated dispensing amount of the liquid crystal material.

In Step S505, a determined amount of electric power may be supplied to the solenoid coil 130 (in FIGS. 7A and 7B) by controlling a power supply 150 (in FIGS. 7A and 7B).

In Step S508, the liquid crystal material may be dispensed at the dispensing position of the dispensing pattern.

In Step S506, gas pressure to be applied to the liquid crystal material container 124 (in FIGS. 7A and 7B) and a corresponding supply amount of gas may be determined on a basis of the calculated dispensing amount of the liquid crystal material.

In Step S507, as shown in FIGS. 7A and 7B, by controlling the flow control valve 154, a flow gas amount determined from the flow supply unit 152 may be supplied to the liquid crystal material container 124, thereby dispensing the liquid crystal material 107.

The electric power supplied to the solenoid coil 130 and the amount of gas supplied to the liquid crystal material container 124 may be controlled at the same time, or separately while maintaining one of the gas flow amount and amount of supplied electric power constant.

Although not shown, the substrate may move at the time of dispensing the liquid crystal material so that the liquid crystal dispensing apparatus may be placed at the dispensing position on the substrate.

Figure 13:
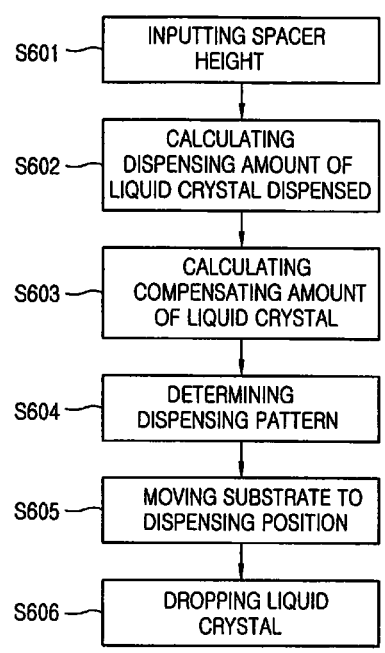
FIG. 13 is a flow chart of another exemplary LCD device fabrication method according to the present invention.

FIG. 13 is a flow chart of another exemplary LCD device fabrication method according to the present invention. In FIG. 13, Step S601 the height of the patterned spacers measured in a spacer forming process may be input.

In Step S602, an amount of the liquid crystal material dispensed on the substrate may be calculated on a basis of the input patterned spacer height.

In Step S603, a compensated amount of the liquid crystal material may be calculated by comparing the calculated dispensing amount of the liquid crystal material with the predetermined dispensing amount of the liquid crystal material, i.e., the dispensing amount of the liquid crystal material which was previously determined.

In Step S604, a dispensing position and dispensing times of the liquid crystal material may be determined, thereby determining a dispensing pattern of the amount of the liquid crystal material compensated.

In Step S605, a liquid crystal dispensing apparatus 120 (in FIGS. 7A and 7B) may be aligned to the dispensing position corresponding to the determined dispensing pattern by driving the substrate.

In Step S606, the liquid crystal material may be dispensed onto the substrate.

The amount of the liquid crystal material dispensed from the liquid crystal dispensing apparatus 120 may not be the compensated amount of the liquid crystal material, but instead may be the total dispensing amount of the liquid crystal material which was obtained by adding the compensated amount of the liquid crystal material to the dispensing amount of the liquid crystal material or by subtracting the compensated amount of the liquid crystal material from the dispensing amount of the liquid crystal material. In addition, the determined dispensing pattern may not be just the dispensing pattern corresponding to the compensated amount of the liquid crystal material, but may be a total dispensing pattern to which the compensated amount of the liquid crystal material may be applied.

Figure 14:
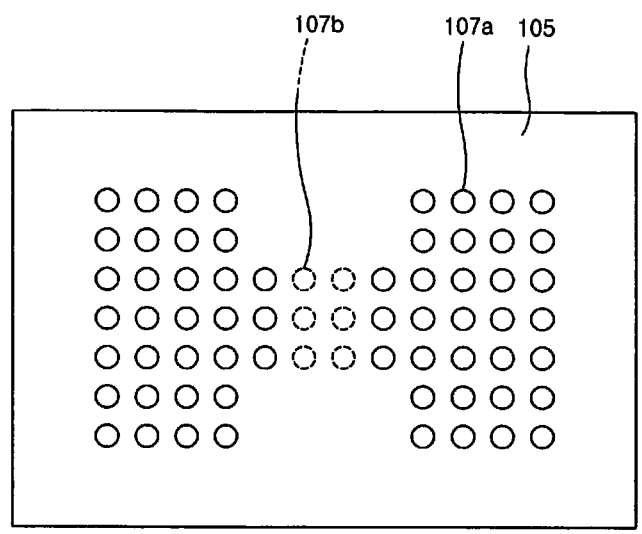
FIG. 14 is a plan view of an exemplary liquid crystal dispensing pattern according to the present invention.

FIG. 14 is a plan view of an exemplary liquid crystal dispensing pattern according to the present invention. In FIG. 14, a dispensing pattern of liquid crystal material may include several different types according to display panel characteristics, such as a shape of the display panel, liquid crystal material characteristics, such as viscosity of the liquid crystal material, and operational modes of the liquid crystal display device. For example, the dispensing pattern of a dumbbell shape may be used in the liquid crystal display device of a TN mode.

A drop shape of the liquid crystal material dropped onto the liquid crystal display panel 105 spreads out due to application of pressure, thereby flowing evenly across an entire area of the liquid crystal display panel 105. In addition, flow of the liquid crystal material on the liquid crystal display panel 105 may be influenced by the shape of the liquid crystal display panel 105 and the device pattern formed on the liquid crystal display panel 105. In the case of the liquid crystal display panel 105 having a square shape, the liquid crystal material may be dispersed for a longer time along a horizontal direction than along a vertical direction, so that the dispensing pattern of the liquid crystal material may be biased along the horizontal direction. In addition, a color filter (not shown) formed on the liquid crystal display panel 105 may be formed towards a data line direction of the liquid crystal display panel, i.e., y-direction on the substrate, so that a step is generated towards a gate line direction, i.e., x-direction. Thus, the liquid crystal dispersion speed along the x-direction decreases with respect to the y-direction.

In the TN mode, rubbing directions of alignment layers (not shown) formed on upper and lower substrates of the liquid crystal display panel 105 may be perpendicular to each other. The perpendicular rubbing directions attenuate a liquid crystal dispersion speed during assembly of the substrates so that the rubbing directions of the alignment layers do not have a significant influence on the liquid crystal dispersion. However, the rubbing directions of the alignment layers are not completely excluded from influencing the liquid crystal dispersion. Accordingly, main factors which may have an influence on the dispensing pattern of the liquid crystal material during the assembly of the substrates include the shape of the substrates and device patterns formed on the substrates. Therefore, the liquid crystal material 107a and 107b may be dispensed on the liquid crystal display panel 105 with a dispensing pattern of the dumbbell shape, as shown in FIG. 14.

The compensated dispensing pattern may be added to the predetermined dispensing pattern, or may be subtracted therefrom. The addition or subtraction of the compensated dispensing pattern may be performed at a center portion of the dispensing pattern of the dumbbell shape. In FIG. 14, the dispensing pattern formed of a full line 107a denotes a predetermined dispensing pattern, and the dispensing pattern formed of a dotted line 107b denotes the dispensing pattern to be compensated. That is, when the compensated dispensing pattern is added to the predetermined dispensing pattern (that is, an amount of the liquid crystal material is increased), the dotted line denotes the compensated dispensing pattern to be added 107b and thus the additional liquid crystal material is dispensed on the position. In addition, when the predetermined dispensing pattern is decreased by the compensated dispensing pattern, the dispensing pattern represented by the dotted line 107b is removed from the predetermined dispensing pattern, thereby stopping dispensing onto the dispensing pattern 107b.

It will be apparent to those skilled in the art that various modifications and variations can be made in the apparatus and method for dispensing liquid crystal material of the present invention without departing from the spirit or scope of the invention. Thus, it is intended that the present invention cover the modifications and variations of this invention provided they come within the scope of the appended claims and their equivalents.

What is claimed is:

1. A liquid crystal material dispensing apparatus, comprising:
    a spacer height measuring unit for measuring a height of a spacer on a substrate; and
    a liquid crystal material dispensing system configured to dispense liquid crystal material onto the substrate and compensate an initial amount of the liquid crystal material dispensed on the substrate; and
    a control unit in the liquid crystal material dispensing system arranged to determine a dispensing pattern of the liquid crystal material in a dumbbell shape onto the substrate based upon the measured spacer height, a shape of the substrate, viscosity of the liquid crystal material, and operational modes of the liquid crystal display device, and to compensate the liquid crystal material at a center portion of the dispensing pattern of the dumbbell shape, wherein the liquid crystal dispensing system includes:

a liquid crystal material dispensing device for dispensing the liquid crystal material through a nozzle onto the substrate and for controlling an amount of the liquid crystal material dispensed in accordance with movement of a needle along upward and downward directions by a magnetic force from a solenoid coil and tension of a spring to open and close a discharging hole connected to the nozzle, the liquid crystal material dispensing device including a magnetic bar above the needle and a gap controlling unit connected to the magnetic bar to move the magnetic bar in upper and lower directions when the magnetic force is not activated by the magnetic bar, thereby the distance between the magnetic bar and the needle is controlled in case where the discharging hole is closed by the needle in order to control the movement range of the needle when the magnetic force is activated;

a power supply for providing electric power to the solenoid coil; and a gas supply for providing pressurized gas to the liquid crystal material dispensing device, wherein the electric power supply and the gas supply are controlled by the control unit to dispense a predetermined amount of the liquid crystal material onto the substrate, wherein the spacer height measuring unit is formed integrally with the liquid crystal material dispensing device.

2. The apparatus according to claim 1, wherein the spacer includes a column spacer.

3. The apparatus according to claim 1, wherein the substrate includes a thin film transistor substrate.

4. The apparatus according to claim 1, wherein the substrate includes a color filter substrate.

5. The apparatus according to claim 1, wherein the control unit includes:
   a dispensing amount calculating unit for calculating the amount of the liquid crystal material based on the spacer height input from the spacer height measuring unit;
   an electric power control unit for controlling the power supply to supply electric power corresponding to the calculated dispensing amount of the liquid crystal material to the solenoid coil; and
   a substrate driving unit for driving the substrate to locate a dispensing position below the liquid crystal material dispensing device.

6. The apparatus according to claim 5, wherein the dispensing amount calculating unit includes a dispensing pattern determining unit for determining a pattern of the liquid crystal material.

7. The apparatus according to claim 5, wherein the dispensing amount calculating unit further includes a compensated dispensing pattern determining unit for determining a compensated dispensing pattern by calculating an error of the dispensing amount of the liquid crystal material based on the spacer height.

8. The apparatus according to claim 1, wherein the control unit includes:
   a dispensing amount calculating unit for calculating an amount of the liquid crystal material based on the spacer height input from the spacer height measuring unit;
   a flow control unit for controlling flow of the gas supply to supply gas corresponding to the determined amount of the liquid crystal material dispensed to a liquid crystal material container; and
   a substrate driving unit for driving the substrate to locate a dispensing position below the liquid crystal material dispensing device.

9. The apparatus according to claim 8, wherein the dispensing amount calculating unit includes a dispensing pattern determining unit for determining a pattern of the liquid crystal material dispensed.

10. The apparatus according to claim 8, wherein the dispensing amount calculating unit further includes a compensated dispensing pattern determining unit for determining a compensated dispensing pattern by calculating an error of the amount of the liquid crystal material dispensed based on the spacer height.

11. The apparatus according to claim 1, wherein the control unit includes:
   a dispensing amount calculating unit for calculating an amount of the liquid crystal material based on the spacer height input from the spacer height measuring unit;
   an electric power control unit for controlling the power supply to supply electric power corresponding to the calculated dispensing amount of the liquid crystal material to the solenoid coil;
   a flow control unit for controlling flow of the gas supply to supply gas corresponding to the calculated dispensing amount of the liquid crystal material to the liquid crystal container; and
   a substrate driving unit for driving the substrate to locate a dispensing position below the liquid crystal material dispensing device.

12. The apparatus according to claim 11, wherein the dispensing amount calculating unit includes a dispensing pattern determining unit for determining a pattern of the liquid crystal material dispensed.

13. The apparatus according to claim 11, wherein the dispensing amount calculating unit further includes a compensated dispensing pattern determining unit for determining a compensated dispensing pattern by calculating an error of the amount of the liquid crystal material dispensed based on the spacer height.

14. The apparatus according to claim 1, wherein the control unit includes an output unit for outputting the determined spacer height, the determined amount of the liquid crystal material dispensed, and a current situation of the liquid crystal material dispensing.

15. The apparatus according to claim 1, wherein the spacer height measuring unit is included with the liquid crystal material dispensing system.

16. The apparatus according to claim 1, wherein the spacer height measuring unit is separate from the liquid crystal material dispensing system.

* * * * *